US012534871B2

(12) United States Patent
Moore

(10) Patent No.: US 12,534,871 B2
(45) Date of Patent: Jan. 27, 2026

(54) RODS FOR ENGAGING A TOOL OF A HAMMER WITHIN A HOUSING OF THE HAMMER

(71) Applicant: Caterpillar Inc., Peoria, IL (US)

(72) Inventor: Cody Moore, Lorena, TX (US)

(73) Assignee: Caterpillar Inc., Peoria, IL (US)

( * ) Notice: Subject to any disclaimer, the term of this patent is extended or adjusted under 35 U.S.C. 154(b) by 679 days.

(21) Appl. No.: 17/937,217

(22) Filed: Sep. 30, 2022

(65) Prior Publication Data

US 2024/0110362 A1 Apr. 4, 2024

(51) Int. Cl.

*E02F 3/96* (2006.01)
*B25D 9/04* (2006.01)
*B25D 9/12* (2006.01)
*B25D 17/06* (2006.01)

(52) U.S. Cl.

CPC ................ *E02F 3/966* (2013.01); *B25D 9/04* (2013.01); *B25D 9/12* (2013.01); *B25D 17/06* (2013.01); *B25D 2250/121* (2013.01)

(58) Field of Classification Search

CPC .. E02F 3/966; B25D 9/04; B25D 9/12; B25D 17/06; B25D 2250/121; B25D 2250/355; B25D 17/08; E01H 5/06; E01H 5/061; E01H 5/062; E01H 5/063; E01H 5/065; E01H 5/066

See application file for complete search history.

(56) References Cited

U.S. PATENT DOCUMENTS

| | | | | | |
|---|---|---|---|---|---|
| 1,798,257 | A * | 3/1931 | Hansen | B25D 17/08 | 384/42 |
| 5,009,440 | A | 4/1991 | Manschitz | | |
| 5,123,710 | A * | 6/1992 | Morrell | E21C 27/28 | 173/162.1 |
| 5,704,744 | A | 1/1998 | Kleine et al. | | |
| 5,735,610 | A * | 4/1998 | Mark | F16C 29/02 | 384/42 |
| 7,980,240 | B2 * | 7/2011 | Robson | B25D 17/02 | 125/41 |
| 10,035,251 | B2 | 7/2018 | Moore | | |

(Continued)

FOREIGN PATENT DOCUMENTS

| | | | | |
|---|---|---|---|---|
| CN | 104018541 B | 7/2016 | | |
| CN | 213867979 U * | 8/2021 | E02F 3/04 | |

(Continued)

OTHER PUBLICATIONS

Written Opinion and International Search Report for Int'l. Patent Appln. No. PCT/US2023/072543, mailed Nov. 7, 2023 (11 pgs).

*Primary Examiner* — Anna K Kinsaul
*Assistant Examiner* — Mobeen Ahmed

(57) ABSTRACT

A hydraulic hammer includes a housing configured to receive a housing portion of a tool and a first plurality of rods provided in the housing. The first plurality of rods are configured to engage a first portion of the housing portion of the tool. The first plurality of rods are parallel to a longitudinal axis of the tool. The hydraulic hammer further includes a second plurality of rods provided in the housing. The second plurality of rods are configured to engage a second portion of the housing portion of the tool. The second plurality of rods are parallel to the longitudinal axis of the tool.

20 Claims, 3 Drawing Sheets

(56) References Cited

U.S. PATENT DOCUMENTS

| | | | | |
|---|---|---|---|---|
| 10,239,195 | B2 * | 3/2019 | Moore | B25D 17/02 |
| 11,613,869 | B2 * | 3/2023 | Robson | E02F 3/966 173/200 |
| 2012/0145424 | A1 * | 6/2012 | Nickels | E02F 3/966 173/90 |
| 2014/0208575 | A1 | 7/2014 | Jagdale et al. | |
| 2015/0129269 | A1 * | 5/2015 | Muuttonen | E21B 1/04 173/206 |
| 2016/0221170 | A1 * | 8/2016 | Moore | B25D 9/145 |
| 2016/0243689 | A1 * | 8/2016 | Romagnoli | B23B 51/08 |
| 2017/0036336 | A1 * | 2/2017 | Moore | B25D 9/00 |
| 2017/0087706 | A1 * | 3/2017 | Moore | E02F 3/966 |
| 2017/0136611 | A1 | 5/2017 | Moore | |
| 2017/0136612 | A1 * | 5/2017 | Moore | B25D 17/082 |
| 2018/0169848 | A1 * | 6/2018 | Phan | B25D 17/02 |
| 2018/0305892 | A1 * | 10/2018 | Robson | B28D 1/26 |
| 2019/0381645 | A1 * | 12/2019 | Beckhusen | B25D 9/18 |
| 2021/0340722 | A1 * | 11/2021 | Robson | E02F 9/22 |
| 2023/0398674 | A1 * | 12/2023 | Sato | B25D 17/24 |

FOREIGN PATENT DOCUMENTS

| | | | |
|---|---|---|---|
| FR | 2320812 | A2 | 3/1977 |
| KR | 20-2010-0006437 | U | 6/2010 |
| KR | 10-1230351 | B1 | 2/2013 |
| KR | 10-2369966 | B1 | 3/2022 |
| RU | 163592 | U1 | 7/2016 |

* cited by examiner

RODS FOR ENGAGING A TOOL OF A HAMMER WITHIN A HOUSING OF THE HAMMER

TECHNICAL FIELD

The present disclosure relates generally to a hammer of a machine and, for example, to rods that engage a tool provided in a housing the hammer.

BACKGROUND

A hydraulic hammer may be attached to a work machine such as an excavator, a wheel loader, and/or a backhoe, among other examples. The hydraulic hammer may be configured to perform various operations, such as breaking concrete and/or breaking rocks, among other examples. The hydraulic hammer may perform the various operations as a result of a flow of a hydraulic fluid from the work machine.

Typically, the hydraulic hammer includes a housing that receives a tool and two cylindrical bushings (in the housing) that receive the tool. As the tool is used to perform the various operations discussed above, a movement of the tool and/or a vibration of the tool causes the bushings to experience wear. Typically, the bushings experience uneven wear. For example, small portions of the bushings (e.g., bottom portions) may experience a significant amount of wear while other remaining portions of the bushings may experience insignificant to no amount of wear. In this regard, the bushings may be replaced when the amount of wear, of the small portions, satisfies a wear threshold, despite the other remaining portions of the bushings experiencing insignificant to no amount of wear.

Additionally to being subject to uneven wear and to premature replacement, the bushings are made from pieces of metal (having large sizes) that are machined to create desired shapes and desired sizes for the bushings. As a result of the pieces of metal being machined to create the desired shapes and the desired sizes, a significant amount of metal is removed and, accordingly, is wasted. Additionally to wasting a significant amount of metal, the bushings have significantly large sizes and are significantly heavy. Accordingly, such significantly large sizes and weights cause servicing and replacement of the bushings to be arduous tasks.

Korean Patent Application Publication No. KR20100006437U (the '437 publication) discloses an arc-shaped rod support that prevents a left and right flow of a rod generated when the rod strikes. The arc-shaped rod support, of the '437 publication, does not address the issues related to the bushings as explained above.

The hammer of the present disclosure solves one or more of the problems set forth above and/or other problems in the art.

SUMMARY

In some implementations, a hydraulic hammer includes a housing configured to receive a housing portion of a tool; a first plurality of rods provided in the housing, wherein the first plurality of rods are configured to engage a first portion of the housing portion of the tool, and wherein the first plurality of rods are parallel to a longitudinal axis of the tool; and a second plurality of rods provided in the housing, wherein the second plurality of rods are configured to engage a second portion of the housing portion of the tool, and wherein the second plurality of rods are parallel to the longitudinal axis of the tool.

In some implementations, a machine includes a machine body; a boom supported by the machine body; a stick mounted to the boom; and a hydraulic hammer mounted to the stick, wherein the hydraulic hammer comprises: a housing configured to receive a tool, a first plurality of rods provided in the housing, wherein the first plurality of rods are configured to engage a first portion of the tool, and a second plurality of rods provided in the housing, wherein the second plurality of rods are configured to engage a second portion of the tool.

In some implementations, a housing of a hammer of a machine includes a first plurality of rods, wherein the first plurality of rods are configured to engage a first portion of a housing portion of a tool; and a second plurality of rods, wherein the second plurality of rods are configured to engage a second portion of the housing portion of the tool, and wherein the second portion is below the first portion.

DETAILED DESCRIPTION

Implementations described herein are directed to replacing bushings, typically included in a housing of a hammer, with a plurality of rods. The plurality of rods may engage a tool received by the housing. The plurality of rods may be provided circumferentially around the tool in the housing. In some situations, the plurality of rods may provide a guiding surface for guiding the tool as the tool is being received by the housing.

The plurality of rods may be configured to distribute wear, caused by a movement of the tool, to multiples rods. Each rod of the plurality of rods may be replaced individually as an amount of wear of the rod satisfies a wear threshold (e.g., as the amount of wear reaches a wear limit). In some examples, the plurality of rods may be inserted into the housing via an opening in a portion of the housing (e.g., via an opening in a front head of the housing).

In some instances, the tool may include a plurality of grooves. In this regard, each rod, of the plurality of rods, may engage with a corresponding one of the plurality of grooves. In some implementations, the housing may include a first plurality of rods and a second plurality of rods.

In some examples, a size, a shape, and/or a weight of two or more rods, of the first plurality of rods, may be same. Accordingly, the two or more rods may be configured to replace each other. Similarly, a size, a shape, and/or a weight of two or more rods, of the second plurality of rods, may be same. Accordingly, the two or more rods (of the second plurality of rods) may be configured to replace each other. Furthermore, at least one rod (of the first plurality of rods) and at least one rod (of the second plurality of rods) may be configured to replace each other.

One or more rods, of the first plurality of rods, may be rotatably provided in the housing such that the one or more rods are configured to rotate as a result of a movement of the tool. Based on the one or more rods rotating during the movement of the tool, an amount of wear experienced by a rod may be distributed to multiple portions of the rod (as opposed to a small single bottom portion of the rod).

Additionally, a cylindrical shape of the rod may enable less material to be removed from a piece of metal (during a manufacturing process to produce the rod) than an amount of material removed from a piece of metal during the manufacturing process to produce the bushings.

The term "machine" may refer to a device that performs an operation associated with an industry such as, for example, mining, construction, farming, transportation, or another industry. Moreover, one or more implements may be connected to the machine. As an example, a machine may include a construction vehicle, a work vehicle, or a similar vehicle associated with the industries described above.

Figure 1:
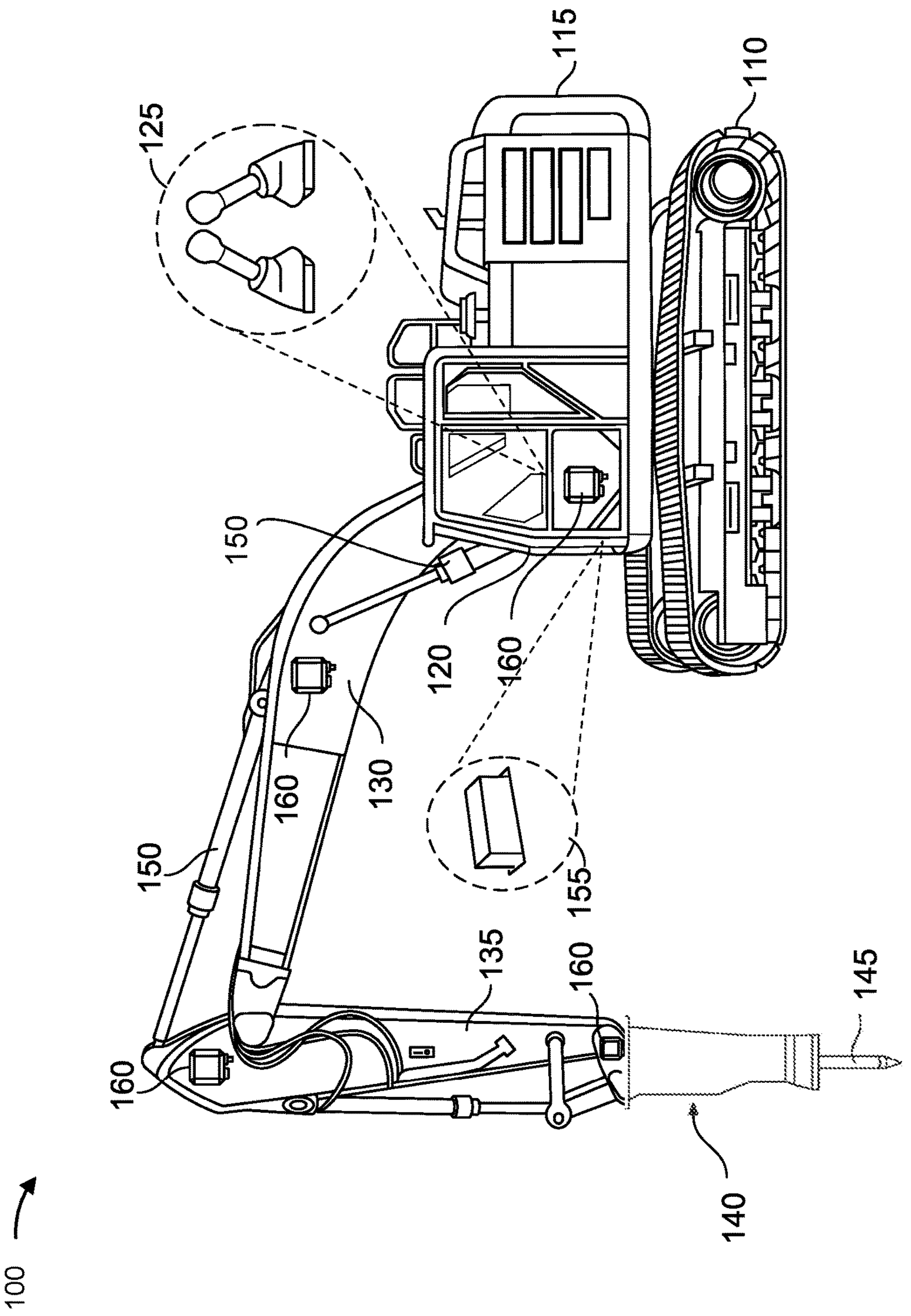
FIG. 1 is a diagram of an example machine described herein.

FIG. 1 is a diagram of an example machine 100 described herein. As shown in FIG. 1, machine 100 is embodied as an earth moving machine, such as an excavator. Alternatively, the machine 100 may be another type of machine, such as a dozer.

As shown in FIG. 1, machine 100 includes ground engaging members 110, a machine body 115, and an operator cabin 120. Ground engaging members 110 may include tracks (as shown in FIG. 1), wheels, rollers, and/or the like, for propelling machine 100. Ground engaging members 110 are mounted to a rotating frame (not shown) and are driven by one or more engines and drive trains (not shown). Machine body 115 is mounted on the rotating frame (not shown). Operator cabin 120 is supported by machine body 115 mounted on the rotating frame. Operator cabin 120 includes an integrated display (not shown) and operator controls 125, such as, for example, an integrated joystick. Operator controls 125 may include one or more input components. In some examples, the controller may provide a notification indicating that the machine has transitioned from operating in the first lifting mode to operating in the second lifting mode.

For an autonomous machine, operator controls 125 may not be designed for use by an operator and, rather, may be designed to operate independently from an operator. In this case, for example, operator controls 125 may include one or more input components that provide an input signal for use by another component without any operator input. Machine 100 may include a swivel member (not shown) that enable the rotating frame (and machine body 115) to rotate (or swivel). For example, the swivel element may enable the rotating frame (and machine body 115) to rotate (or swivel) with respect to ground engaging members 110.

As shown in FIG. 1, machine 100 includes a boom 130, a stick 135, and a hammer 140. Boom 130 is pivotally mounted at its proximal end to machine body 115 and is articulated relative to machine body 115 by one or more fluid actuation cylinders (e.g., hydraulic or pneumatic cylinders), electric motors, and/or other electro-mechanical components. Stick 135 is pivotally mounted at a distal end of boom 130 and is articulated relative to boom 130 by one or more fluid actuation cylinders, electric motors, and/or other electro-mechanical components. Boom 130 and/or stick 135 may be referred to as a linkage. Hammer 140 is mounted at a distal end of stick 135 and may be articulated relative to stick 135 by one or more fluid actuation cylinders, electric motors, and/or other electro-mechanical components.

As an example, a hydraulic pump (not shown) may be configured to provide hydraulic fluid (e.g., pressurized hydraulic fluid) to cause one or more one or more hydraulic cylinders 150 to articulate boom 130, stick 135, and/or hammer 140, as described above. In this regard, hammer 140 may be referred to as a hydraulic hammer. Hammer 140 may include a tool 145. A hydraulic supply system (associated with the hydraulic pump) may drive hammer 140 to provide a reciprocating impact motion to tool 145.

Based on the reciprocating impact motion, tool 145 may perform various operations, such as breaking concrete, breaking rocks, and/or chipping metal slag from pots in a foundry, among other examples. For example, tool 145 may be actuated to produce cyclic vibrational movement at an intensity sufficient to perform the various operations discussed above. As shown in FIG. 1, as an example, tool 145 may include a bit. Alternatively, tool 145 may include other components that are configured to interact with hammer 140 to perform the various actions discussed above.

A housing of hammer 140 may include a plurality of rods configured to guide tool 145 when tool 145 is being received by the housing and to engage tool 145 in the housing after tool 145 has been received. The housing and the plurality of rods are described in more detail below in connection with FIG. 2 and FIG. 3.

As shown in FIG. 1, machine 100 includes a controller 155 (e.g., an electronic control module (ECM), a computer vision controller, an autonomy controller, among other examples) and one or more inertial measurement units (IMUs) 160 (referred to herein individually as "IMU 150," and collectively referred to as "IMUs 160"). Controller 155 may control and/or monitor operations of machine 100.

As shown in FIG. 1, IMUs 160 are installed at different positions on components or portions of machine 100, such as, for example, on machine body 115, boom 130, stick 135, and hammer 140. An IMU 160 includes one or more devices that are capable of receiving, generating, storing, processing, and/or providing signals indicating a position and orientation of a component, of machine 100, on which the IMU 160 is installed. While the example discussed herein refers to IMUs 160, the present disclosure is applicable to using one or more other types of sensor devices that may be used to determine a position and orientation of a component of machine 100.

As indicated above, FIG. 1 is provided as an example. Other examples may differ from what was described in connection with FIG. 1.

Figure 2:
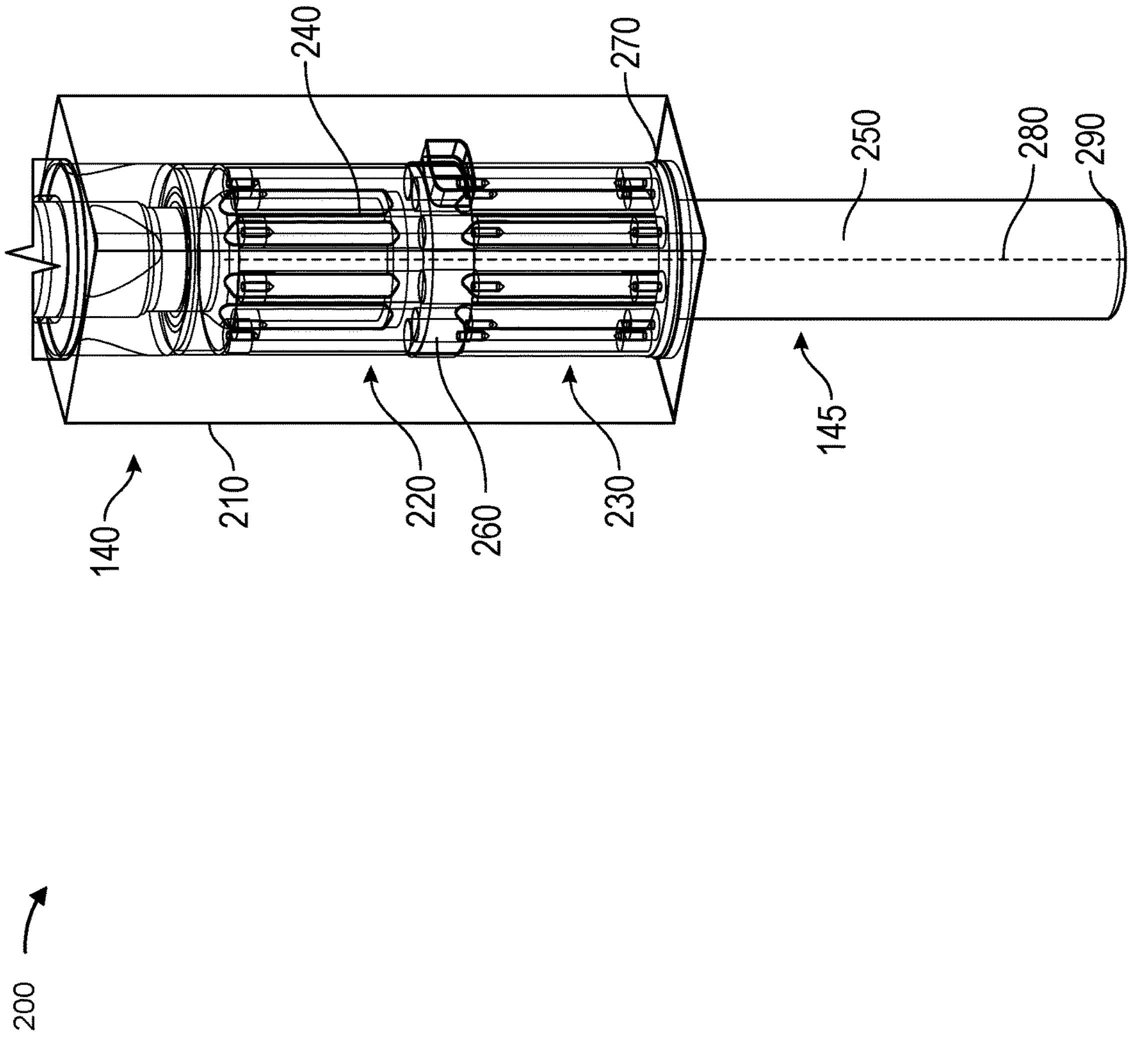
FIG. 2 is a diagram of a perspective view of an example hammer described herein.

FIG. 2 is a diagram 200 of a perspective view of an example hammer described herein. As shown in FIG. 2, the example hammer is hammer 140. As shown in FIG. 2, hammer 140 may include tool 145, a housing 210, a first plurality of rods 220, a second plurality of rods 230, a tool stop member 260, and a retaining member 270. Housing 210 may comprise a metal, a polymer, and/or a plastic material, among other examples. Housing 210 may be configured to receive a portion of tool 145. For example, housing 210 may be configured to receive a housing portion 240 of tool 145. An exposed portion 250 of tool 145 may be external with respect to housing 210.

A distance between housing portion 240 and a work end 290 of tool 145 may exceed a distance between exposed portion 250 and work end 290. In some situations, depending on an orientation of hammer 140, housing portion 240 may be a top portion of tool 145 and exposed portion 250 may be a bottom portion of tool 145. For example, when hammer 140 is provided in a vertical position as shown in FIG. 2, housing portion 240 may be the top portion that is provided above the bottom portion of tool 145 (e.g., provided above exposed portion 250).

Housing 210 may include a power cell (not shown) and a piston (not shown). The power cell may utilize a fluid (e.g., a hydraulic and/or a pneumatic fluid), to reciprocally impact the piston against an upper end of housing portion 240 to drive tool 145 to perform the various operations discussed herein.

As shown in FIG. 2, housing 210 may further include first plurality of rods 220, second plurality of rods 230, tool stop member 260, and retaining member 270. First plurality of rods 220 may be configured to engage a first portion of housing portion 240 of tool 145. As shown in FIG. 2, first plurality of rods 220 may be parallel to a longitudinal axis 280 of tool 145. First plurality of rods 220 may be circumferentially provided around tool 145 when tool 145 is received by housing 210.

In some examples, a size, a weight and/or a shape of two or more rods, of first plurality of rods 220, may be same. For example, a length of a first rod (of first plurality of rods 220) may be same as a length of a second rod (of first plurality of rods 220), a width of the first rod may be same as a width of the second rod, a diameter of the first rod may be same as a diameter of the second rod, a weight of the first rod may be same as a weight of the second rod, and/or a shape of the first rod may be same as a shape of the second rod. Accordingly, the first rod and the second rod may be configured to replace each other.

A rod, of first plurality of rods 220, may comprise steel. Additionally, or alternatively, the rod may comprise brass, carbide, and/or a non-metallic material. In some implementations, the rod may have a diameter of approximately 53 mm, a length of approximately 300 mm, and a weight of approximately 5 kg.

In some examples, first plurality of rods 220 may be rotatably provided in housing 210. For example, one or more rods, of first plurality of rods 220, may be configured to rotate during a movement of tool 145 (e.g., during an operation of tool 145). By rotating in this manner, an amount of wear of a rod may be distributed to multiple portions of the rod, as opposed to a single portion of the rod experiencing wear. By distributing the amount of wear to multiple portions, a life of the rod may be extended. Accordingly, the rod may not be replaced prematurely.

As shown in FIG. 2, second plurality of rods 230 may be configured to engage a second portion of housing portion 240 of tool 145. The second portion of housing portion 240 may be opposite with respect to the first portion of housing portion 240. As shown in FIG. 2, second plurality of rods 230 may be parallel to longitudinal axis 280 of tool 145. Second plurality of rods 230 may be circumferentially provided around tool 145 when tool 145 is received by housing 210.

In some examples, a size, a weight, and/or a shape of two or more rods, of second plurality of rods 230, may be same. For example, a length of a third rod (of second plurality of rods 230) may be same as a length of a fourth rod (of second plurality of rods 230), a width of the third rod may be same as a width of the fourth rod, a diameter of the third rod may be same as a diameter of the fourth rod, a weight of the third rod may be same as a weight of the fourth rod, and/or a shape of the third rod may be same as a shape of the fourth rod. Accordingly, the third rod and the fourth rod may be configured to replace each other.

Similarly, a size, a weight, and/or a shape of one or more first rods, of first plurality of rods 220, may be same as a size, a weight, and/or a shape of one or more second rods of second plurality of rods 230. Accordingly, the one or more first rods and the one or more second rods may be configured to replace each other. For example, the first rod and the third rod may be configured to replace each other.

In some examples, second plurality of rods 230 may be rotatably provided in housing 210. For example, one or more rods, of second plurality of rods 230, may be configured to rotate during a movement of tool 145 (e.g., during an operation of tool 145). By rotating in this manner, an amount of wear of a rod may be distributed to multiple portions of the rod, as explained above in connection with first plurality of rods 220.

In some implementations, a quantity of second plurality of rods 230 is equal to a quantity of first plurality of rods 220. In some implementations, housing 210 may include a single plurality of rods. For example, housing 210 may include second plurality of rods 230 without including first plurality of rods 220. Alternatively, housing 210 may include first plurality of rods 220 without including second plurality of rods 230.

As shown in FIG. 2, tool stop member 260 may be provided between first plurality of rods 220 and second plurality of rods 230. Tool stop member 260 may comprise a metal, a polymer, and/or a plastic material, among other examples. In some instances, tool stop member 260 may be configured to limit a movement of tool 145, along longitudinal axis 280, in a direction toward first plurality of rods 220. For example, when hammer 140 is provided in a vertical position as shown in FIG. 2, the movement may be an upward movement and the direction may be an upward direction. By prevent the movement of tool 145 in this manner, tool stop member 260 may prevent damage to hammer 140 and/or to components of machine 100, such as boom 130 and/or stick 135, among other examples.

Tool stop member 260 may be provided adjacent to a first end of second plurality of rods 230. As shown in FIG. 2, retaining member 270 may be provided adjacent to a second end of second plurality of rods 230 that is opposite the first end. Retaining member 270 may comprise a metal, a polymer, and/or a plastic material, among other examples. In some instances, retaining member 270 may be configured to limit a movement of tool 145 that may cause tool 145 to be removed from housing 210 (e.g., limit a movement of tool 145 that may cause tool 145 to drop/fall out of housing 210). By prevent the movement of tool 145 in this manner, retaining member 270 may prevent damage to components of machine 100.

As indicated above, FIG. 2 is provided as an example. Other examples may differ from what was described in connection with FIG. 2.

Figure 3:
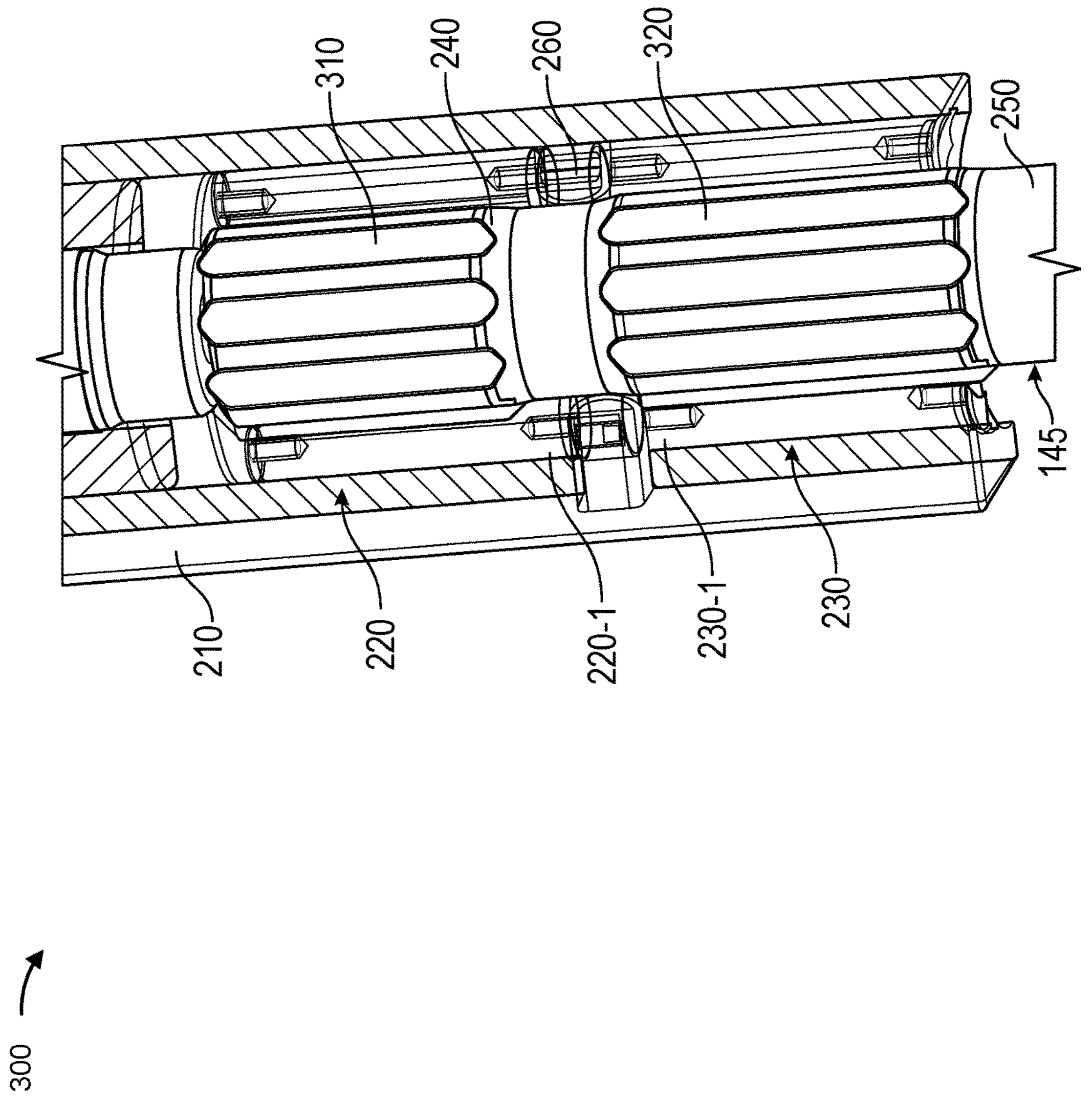
FIG. 3 is a diagram of a cross-sectional view of an example hammer described herein.

FIG. 3 is a diagram 300 of a cross-sectional view of an example hammer described herein. As shown in FIG. 3, the example hammer is hammer 140. Some elements of hammer 140 have been described above in connection with FIG. 2. In some examples, first plurality of rods 220 may be aligned with second plurality of rods 230. For example, as shown in FIG. 3, a first rod 220-1, of the first plurality of rods 220, may be longitudinally aligned with a second rod 230-1 of second plurality of rods 230.

As shown in FIG. 3, the first portion of housing portion 240 of tool 145 includes a first plurality of grooves 310. The second portion of housing portion 240 of tool 145 includes a second plurality of grooves 320. In some implementations, a quantity of first plurality of grooves 310 may be equal to a quantity of first plurality of rods 220. Additionally, or alternatively, a quantity of second plurality of grooves 320 may be equal to a quantity of second plurality of rods 230.

In some implementations, one or more rods, of first plurality of rods 220, may be configured to engage with corresponding one or more grooves of first plurality of grooves 310. Additionally, or alternatively, one or more rods, of second plurality of rods 230, may be configured to engage with corresponding one or more grooves of second plurality of grooves 320. In some examples, a shape of the one or more rods, of first plurality of rods 220, may be same as a corresponding groove of first plurality of grooves 310. Additionally, or alternatively, a shape of the one or more rods, of second plurality of rods 230, may be same as a shape of a corresponding groove of second plurality of grooves 320.

As indicated above, FIG. 3 is provided as an example. Other examples may differ from what was described in connection with FIG. 3.

INDUSTRIAL APPLICABILITY

Implementations described herein are directed to replacing bushings, typically included in a housing of a hammer, with a plurality of rods. Typically, the bushings experience uneven wear. The uneven wear causes the bushings to be replaced prematurely. Additionally to being subject to uneven wear and premature replacement, a significant amount of material is wasted during a manufacturing process of the bushings. Additionally, the bushings have significantly large sizes and are significantly heavy. Accordingly, such significantly large sizes and weights cause servicing and replacement of the bushings to be arduous tasks.

According to implementations described herein, the plurality of rods may be provided circumferentially around the tool in the housing. In this regard, the plurality of rods may distribute wear to several rods. By distributing the wear, the plurality of rods may distribute a contact pressure to several rods and, accordingly, reduce wear experienced by a single rod.

Furthermore, a weight, a size, and/or a shape of the plurality of rods may be same. Accordingly, the plurality of rods may be configured to replace each other. Moreover, a size and a weight of the plurality rods may facilitate servicing and replacement of the plurality of rods.

Furthermore, each rod may be replaced individually as an amount of wear of the rod satisfies a wear threshold. By individually replacing each rod, implementations described herein may lower overall operating costs associated with the hammer. Furthermore, the plurality of rods also provide torsional resistance which is typically controlled by providing additional pins in a typical hammer.

As explained above, a cylindrical shape of a rod (described herein) may enable less material to be removed from a piece of metal than an amount of material removed from a piece of metal during a manufacturing process to produce the bushings. Accordingly, a manufacturing process to produce the rod may be more efficient than the manufacturing process to produce the bushings.

The foregoing disclosure provides illustration and description, but is not intended to be exhaustive or to limit the implementations to the precise forms disclosed. Modifications and variations may be made in light of the above disclosure or may be acquired from practice of the implementations. Furthermore, any of the implementations described herein may be combined unless the foregoing disclosure expressly provides a reason that one or more implementations cannot be combined. Even though particular combinations of features are recited in the claims and/or disclosed in the specification, these combinations are not intended to limit the disclosure of various implementations. Although each dependent claim listed below may directly depend on only one claim, the disclosure of various implementations includes each dependent claim in combination with every other claim in the claim set.

As used herein, "a," "an," and a "set" are intended to include one or more items, and may be used interchangeably with "one or more." Further, as used herein, the article "the" is intended to include one or more items referenced in connection with the article "the" and may be used interchangeably with "the one or more." Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of"). Further, spatially relative terms, such as "below," "lower," "above," "upper," and the like, may be used herein for ease of description to describe one element or feature's relationship to another element(s) or feature(s) as illustrated in the figures. The spatially relative terms are intended to encompass different orientations of the apparatus, device, and/or element in use or operation in addition to the orientation depicted in the figures. The apparatus may be otherwise oriented (rotated 90 degrees or at other orientations) and the spatially relative descriptors used herein may likewise be interpreted accordingly.

What is claimed is:

1. A hydraulic hammer, comprising:
- a housing configured to receive a housing portion of a tool;
- a first plurality of rods provided in the housing,
  - wherein the first plurality of rods are configured to engage a first portion of the housing portion of the tool, and
  - wherein the first plurality of rods are parallel to a longitudinal axis of the tool;
- a second plurality of rods provided in the housing,
  - wherein the second plurality of rods are configured to engage a second portion of the housing portion of the tool, and
  - wherein the second plurality of rods are parallel to the longitudinal axis of the tool; and
- a tool stop member, between the first plurality of rods and the second plurality of rods, configured to limit a movement of the tool, along the longitudinal axis, in a direction towards the first plurality of rods.

2. The hydraulic hammer of claim 1,
- wherein a quantity of the first plurality of rods is equal to a quantity of the second plurality of rods.

3. The hydraulic hammer of claim 1,
- wherein a length of a first rod, of the first plurality of rods, is equal to a length of a second rod of the first plurality of rods, and
  - wherein a width of the first rod is equal to a width of the second rod.

4. The hydraulic hammer of claim 1,
- wherein the first portion of the housing portion of the tool includes a first plurality of grooves,
  - wherein the second portion of the housing portion of the tool includes a second plurality of grooves,
    - wherein one or more rods, of the first plurality of rods, are configured to engage with corresponding one or more grooves of the first plurality of grooves, and
    - wherein one or more rods, of the second plurality of rods, are configured to engage with corresponding one or more grooves of the second plurality of grooves.

5. The hydraulic hammer of claim 1, wherein a length of a first rod, of the first plurality of rods, is equal to a length of a second rod of the second plurality of rods, and wherein a width of the first rod is equal to a width of the second rod.

6. The hydraulic hammer of claim 1, wherein the first plurality of rods are rotatably provided in the housing, and wherein one or more rods, of the first plurality of rods, are configured to rotate during the movement of the tool.

7. The hydraulic hammer of claim 1, wherein a first rod, of the first plurality of rods, is longitudinally aligned with a second rod of the second plurality of rods.

8. A machine, comprising:

a machine body;

a boom supported by the machine body;

a stick mounted to the boom; and a hydraulic hammer mounted to the stick, wherein the hydraulic hammer comprises:

a housing configured to receive a tool, a first plurality of rods provided in the housing and parallel to a longitudinal axis of the tool, wherein the first plurality of rods are configured to engage a first portion of the tool, a second plurality of rods provided in the housing and parallel to the longitudinal axis, wherein the second plurality of rods are configured to engage a second portion of the tool, and a tool stop member, between the first plurality of rods and the second plurality of rods, configured to limit a movement of the tool, along the longitudinal axis, in a direction towards the first plurality of rods.

9. The machine of claim 8, wherein the first portion of the tool includes a first plurality of grooves, wherein the second portion of the tool includes a second plurality of grooves, wherein a quantity of the first plurality of grooves is equal to a quantity of the first plurality of rods, and wherein a quantity of the second plurality of grooves is equal to a quantity of the second plurality of rods.

10. The machine of claim 9, wherein each rod, of the first plurality of rods, is configured to engage with a corresponding one of the first plurality of grooves, and wherein each rod, of the second plurality of rods, is configured to engage with a corresponding one of the second plurality of grooves.

11. The machine of claim 8, wherein a length of a first rod, of the first plurality of rods, is equal to a length of a second rod of the first plurality of rods, wherein a width of the first rod is equal to a width the second rod, and wherein a shape of the first rod is same as a shape of the second rod.

12. The machine of claim 8, wherein a length of a first rod, of the first plurality of rods, is equal to a length of a second rod of the second plurality of rods, wherein a width of the first rod is equal to a width the second rod, and wherein a shape of the first rod is same as a shape of the second rod.

13. The machine of claim 8, wherein the second plurality of rods are rotatably provided in the housing, and wherein one or more rods, of the second plurality of rods, are configured to rotate during the movement of the tool.

14. The machine of claim 8, wherein a first rod, of the first plurality of rods, is longitudinally aligned with a second rod of the second plurality of rods.

15. A housing of a hammer of a machine, the housing comprising:

a first plurality of rods, wherein the first plurality of rods are configured to engage a first portion of a housing portion of a tool, and wherein the first plurality of rods are parallel to a longitudinal axis of the tool;

a second plurality of rods, wherein the second plurality of rods are configured to engage a second portion of the housing portion of the tool, wherein the second plurality of rods are parallel to the longitudinal axis, and wherein the second portion is below the first portion; and a tool stop member, between the first plurality of rods and the second plurality of rods, configured to limit a movement of the tool, along the longitudinal axis, in a direction towards the first plurality of rods.

16. The housing of claim 15, wherein the first plurality of rods are rotatably provided in the housing, wherein the second plurality of rods are rotatably provided in the housing, and wherein one or more rods, of at least one of the first plurality of rods or the second plurality of rods, are configured to rotate during the movement of the tool.

17. The housing of claim 15, wherein a size of a first rod, of the first plurality of rods, is equal to at least one of a size of a second rod of the first plurality of rods or a size of a third rod of the first plurality of rods.

18. The housing of claim 15, wherein the first portion of the housing portion of the tool includes a first plurality of grooves, wherein the second portion of the housing portion of the tool includes a second plurality of grooves, wherein each rod, of the first plurality of rods, is configured to engage with a corresponding one of the first plurality of grooves, and wherein each rod, of the second plurality of rods, is configured to engage with a corresponding one of the second plurality of grooves.

19. The housing of claim 15, wherein a first rod, of the first plurality of rods, is longitudinally aligned with a second rod of the second plurality of rods.

20. The housing of claim 15, wherein each rod, of at least one of the first plurality of rods or the second plurality of rods, is individually replaceable.

* * * * *